2 Sheets--Sheet 1.

W. H. FOYE.
Rotary-Plows.

No. 158,482.  Patented Jan. 5, 1875.

Witnesses.  Inventor.

W. H. FOYE.
Rotary-Plows.

No. 158,482.

2 Sheets--Sheet 2.

Patented Jan. 5, 1875.

Witnesses.
E. S. Harner.
M. Church

Inventor.
Wm. H. Foye
By Hill & Ellsworth
His Attorneys

UNITED STATES PATENT OFFICE.

WILLIAM H. FOYE, OF SAN FRANCISCO, CALIFORNIA.

IMPROVEMENT IN ROTARY PLOWS.

Specification forming part of Letters Patent No. 158,482, dated January 5, 1875; application filed December 22, 1874.

*To all whom it may concern:*

Be it known that I, WILLIAM H. FOYE, of the city and county of San Francisco and State of California, have invented a new and useful Rotary Plow; and I do hereby declare the following to be a full and exact description of the same, reference being had to the accompanying drawings, forming part of this specification, in which—

Figure 1:
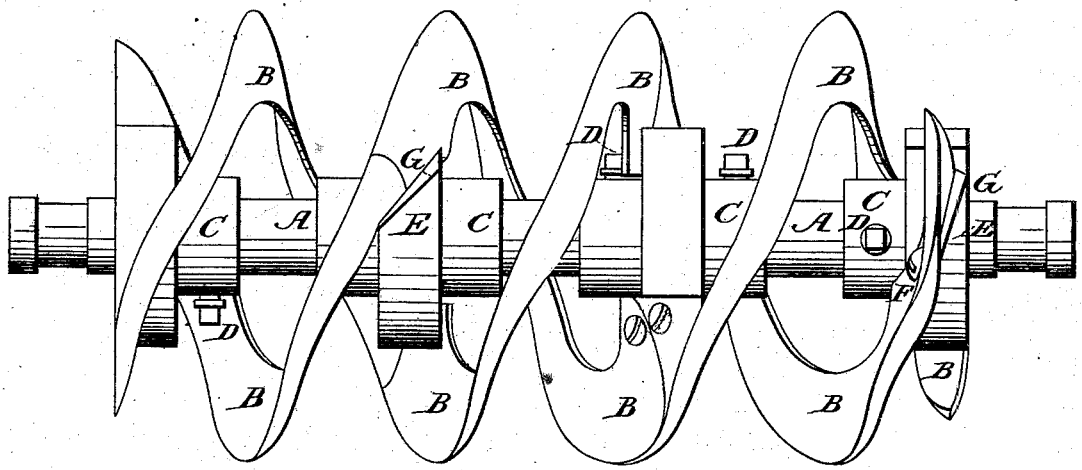
Figure 2:
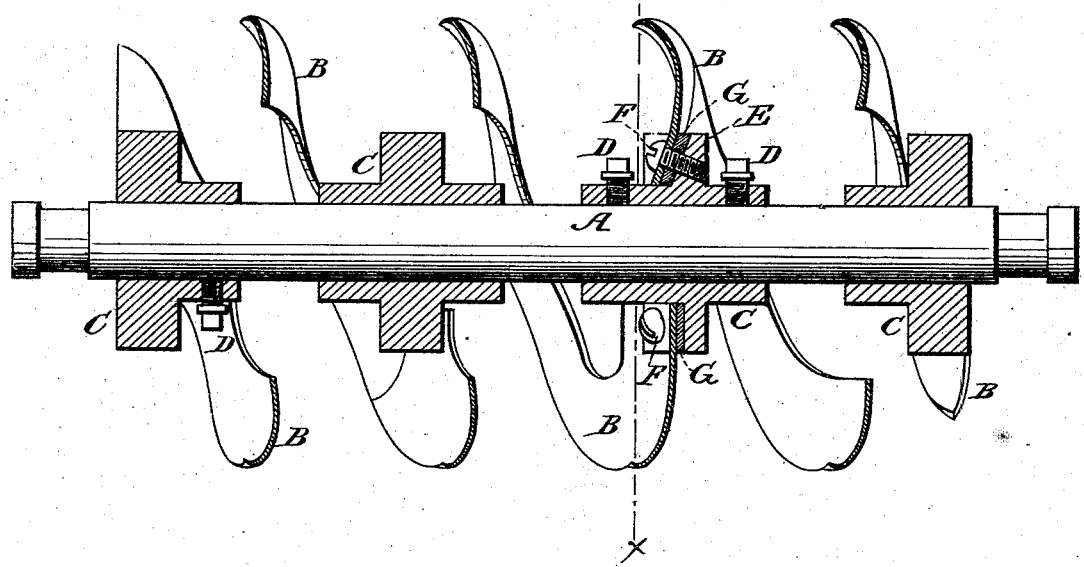
Figure 3:
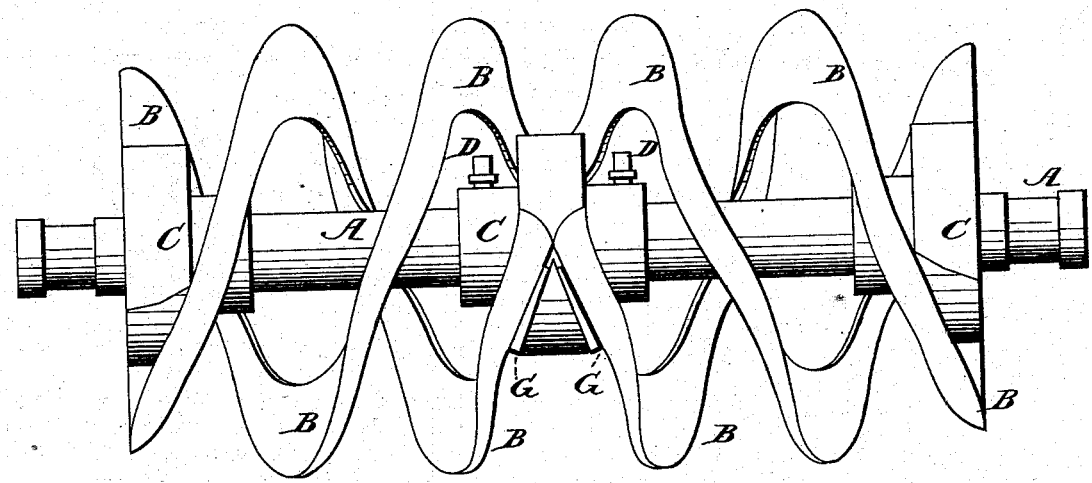
Figure 4:
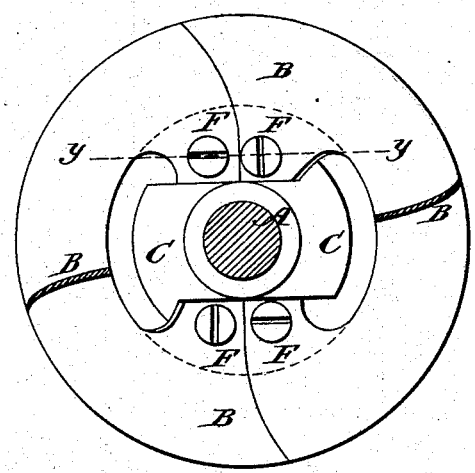
Figure 7:
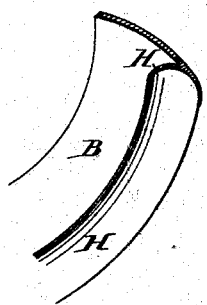
Figure 6:
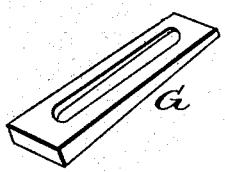
Figure 5:
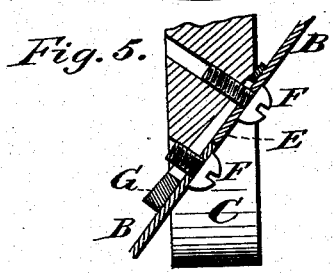

Figure 1, Sheet 1, is a front elevation of my improved plow. Fig. 2, Sheet 1, is a longitudinal section of the same. Fig. 3, Sheet 2, is a front elevation, showing the arrangement of the right and left cutting-blades. Fig. 4, Sheet 2, is a section taken in the plane of the line $x\,x$, Fig. 2. Fig. 5, Sheet 2, is a section in the line $y\,y$, Fig. 4. Fig. 6, Sheet 2, is a perspective view of the adjusting-wedge; and Fig. 7, Sheet 2, is a view showing a modification in the form of the cutting-blades.

Similar letters of reference in the accompanying drawings denote the same parts.

My invention has for its object to provide a cheap, simple, and efficient rotary plow, capable of adjustment for general use in all varieties of soils, and adapted for operation by horse or steam power, so as to bring it within the reach of small as well as large farmers. It is more especially designed for use in the State of California, and other localities where the soil becomes hard and parched during the dry season, and wet and soft during the rainy season of winter, its construction being such as to lift and turn the soil properly, whether wet or dry, to pulverize it to any required depth, and at any season of the year. The special advantages in a plow of this capacity are felt in the localities referred to, because, to insure the largest crops, the seed must be sown before the rainy season commences, and this, of course, necessitates the preparation of the land while hard and dry. The summer-fallowing, which, in such localities, forms a profitable feature of agriculture, is also best attained by my improved plow, by reason of its adaptation to the preparation of the land at all seasons of the year.

To the accomplishment of the results above referred to, the invention consists, first, in constructing the plow with a series of concavo-convex cutting-blades arranged spirally around a supporting and driving shaft, so that, when the shaft is drawn forward, the convex edges of the blades shall enter the ground with a smooth shearing cut, in contradistinction to a scraping and grinding action, separating and lifting the soil, which is caught by the concave faces, and by them turned and dropped into furrows in rear of the plow; secondly, in adjusting the pitch of the spiral blades upon the shaft, for the purpose of regulating the cut of the blades, and the width of the furrows, in accordance with the character of the ground to be plowed; thirdly, in the provision of means for effecting such adjustment; fourthly, in arranging two sets of concavo-convex blades upon the same shaft, extending outward in opposite directions from the center thereof toward the ends, so as to form right and left spiral cutters, for the purpose of preventing the end or longitudinal draft of the plow when drawn forward through the ground at right angles to the axis of rotation.

In the accompanying drawings, A is the main shaft of the plow, mounted in a suitable frame or support in such a manner as to be operated by steam or horse power. When steam is employed as a motor the plow may be arranged, in any preferred manner, behind a low truck adapted to be driven by a small thrashing-engine mounted upon it. B B are the cutting-blades, each constructed in concavo-convex form transversely, and having such a spiral curve as to form one complete coil or circle, more or less. C are collars, mounted upon the shaft at suitable distances apart, and adapted for adjustment thereon by means of set-screws D. The ends of the blades are abutted against each other upon the collars C, so as to form one continuous spiral cutter around the shaft, as shown in Fig. 1, or to form the right and left spiral cutters extending in opposite directions from the center of the shaft outward toward the ends thereof, as shown in Fig. 3.

The collars are constructed with a central flange, which is suitably cut out or recessed to form inclined faces, E, against which the abutting ends of the blades are placed and held by set-screws F, as shown in Fig. 5. The set-screws also pass through slotted wedges, G, interposed between the blades and shoulders, and adapted for adjustment to change the pitch of the blades. When the plow is in operation it moves forward at right angles to its axis of rotation with the convex faces of the blades foremost or against the ground to be plowed. The convex edges therefore rotate downward through the ground with a smooth shearing cut, separating the soil in strips, which are thrown back against the concave faces of the blades, and are by them lifted up, slightly turned, and dropped into furrows behind the plow. The lifting and dropping of the soil pulverizes it to a great extent, and prepares it for its subsequent treatment to receive the seed.

The shearing cut separates the soil with the least resistance, and therefore causes the plow to operate with a less expenditure of power than would be required to drive a plow constructed with flat spiral blades or rotary shovels.

In order to adjust the pitch of the cutting-blades the collars C are loosened upon the shaft, and the ends of the blades are loosened upon the collars. The latter are then slid along the shaft, turning slightly as they move, to increase or decrease the distance from each other, until the requisite pitch is attained, when the collars are again locked to the shaft, and the ends of the blades, together with the wedges G, set up to their places by the adjusting-screws F.

In plowing hard, dry land the pitch of the screw should be the least, in order to cut narrow strips; but in wet or moist land the pitch should be greater, in order to cut the soil in wider strips.

The cutting-blades may be provided with a curved flange or counter-share, H, along their concave faces when the plow is intended for constant use in wet lands, to prevent the damp soil from running upon and clogging the cutters.

For the purpose of preventing the longitudinal draft of the plow due to the spiral or screw action of the cutters in passing through the ground, I employ the right-and-left arrangement of the cutters, as above described, so that the draft shall be equal from the center to the outer ends of the shaft.

The plow may be made of any convenient length, though, preferably, it should not exceed ten or fifteen feet, while the blades may be made of any suitable width varying from one to three feet.

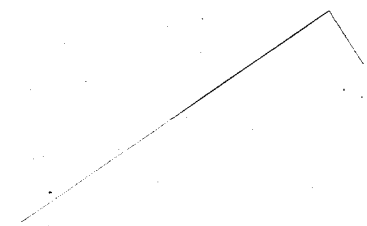

Having thus described my invention, what I claim is—

1. A rotary plow consisting of a series of concavo-convex cutting-blades arranged spirally around a supporting and driving shaft, substantially as described, for the purpose specified.

2. The spiral cutting-blades adapted for adjustment upon the shaft, for the purpose of regulating their cut, and the consequent width of the furrows, substantially as described.

3. The combination of the adjustable collars and slotted wedges with the concavo-convex cutting-blades and the main supporting-shaft, substantially as described, for the purpose specified.

4. A rotary plow having two sets of concavo-convex blades arranged spirally around the supporting-shaft, so as to extend outward in opposite directions from the center thereof toward the ends, substantially as described, for the purpose specified.

5. The blades of a rotary plow, each made with a spiral curve, and with a concavo-convex form transversely, substantially as described, for the purpose specified.

WILLIAM H. FOYE.

Witnesses:
E. A. ELLSWORTH,
M. H. N. KENDIG.